United States Patent [19]

Ostrand et al.

[11] Patent Number: 5,080,140

[45] Date of Patent: Jan. 14, 1992

[54] ROTARY AIR VALVE FOR AIR DISTRIBUTION SYSTEM IN VEHICLES

[75] Inventors: James C. Ostrand, Armada; Donald R. Baxa, Sterling Heights; Carl S. Wize, Armada, all of Mich.

[73] Assignee: General Motors Corporation, Detroit, Mich.

[21] Appl. No.: 625,250

[22] Filed: Dec. 10, 1990

[51] Int. Cl.⁵ ............................................. F16K 1/18
[52] U.S. Cl. ..................................... 137/875; 251/163
[58] Field of Search ................... 251/158, 163, 177; 137/875

[56] References Cited

U.S. PATENT DOCUMENTS

| | | | |
|---|---|---|---|
| 3,570,539 | 3/1971 | Herring | 137/625.44 |
| 4,498,528 | 2/1985 | Jacquet | 165/42 |
| 4,597,414 | 7/1986 | Johnson | 251/158 X |
| 4,627,567 | 12/1986 | Thom | 251/163 X |
| 4,683,913 | 8/1987 | Hoffman et al. | 137/625.4 |

FOREIGN PATENT DOCUMENTS 901538 7/1962 United Kingdom ................ 137/875

*Primary Examiner*—John C. Fox
*Attorney, Agent, or Firm*—Ronald L. Phillips

[57] ABSTRACT

A heating, ventilating and air conditioning system for vehicles incorporating a rotary air valve mounted in a housing for limited arcuate movement with respect to a pivot axis to adjust the amount of opening of two adjacent air flow windows to thereby control the routing and quantity of air flow through the heater core and a heater core bypass. The rotary valve is moved in a track radially spaced above peripheral edges in the housing defining the windows to eliminate frictional drag and wear of the sealing face of the air valve as well as the load on the motor or mechanical actuator. The valve is positioned at an infinitely variable number of positions for partial opening of the windows and a camming system is used to move the valve without drag into or from sealing positions with respect to the two windows.

9 Claims, 5 Drawing Sheets

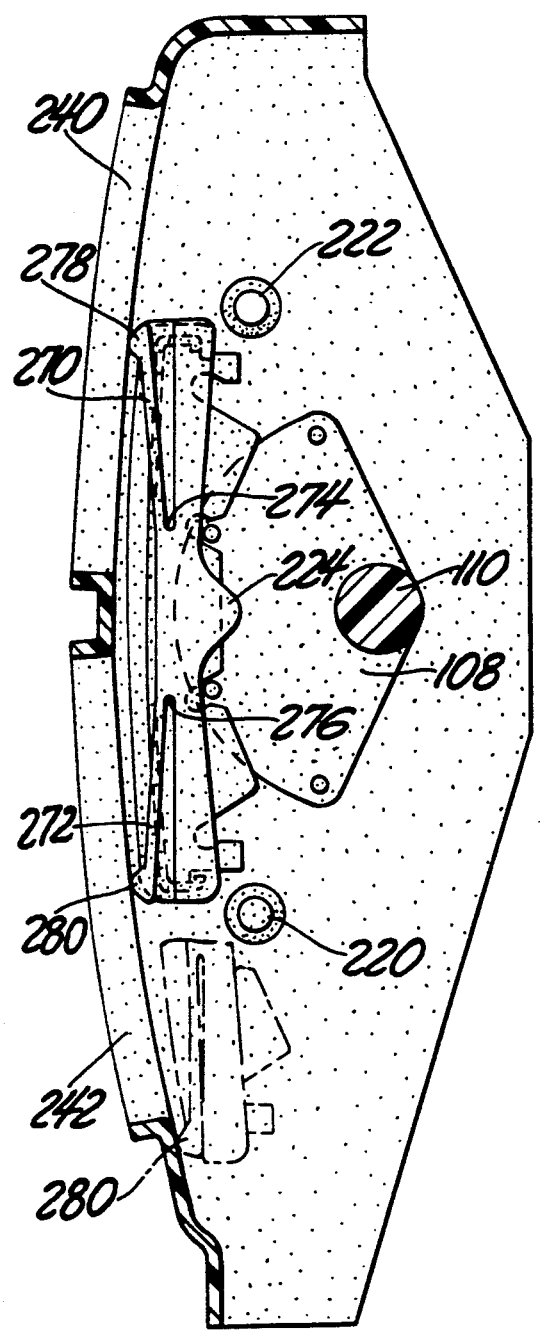
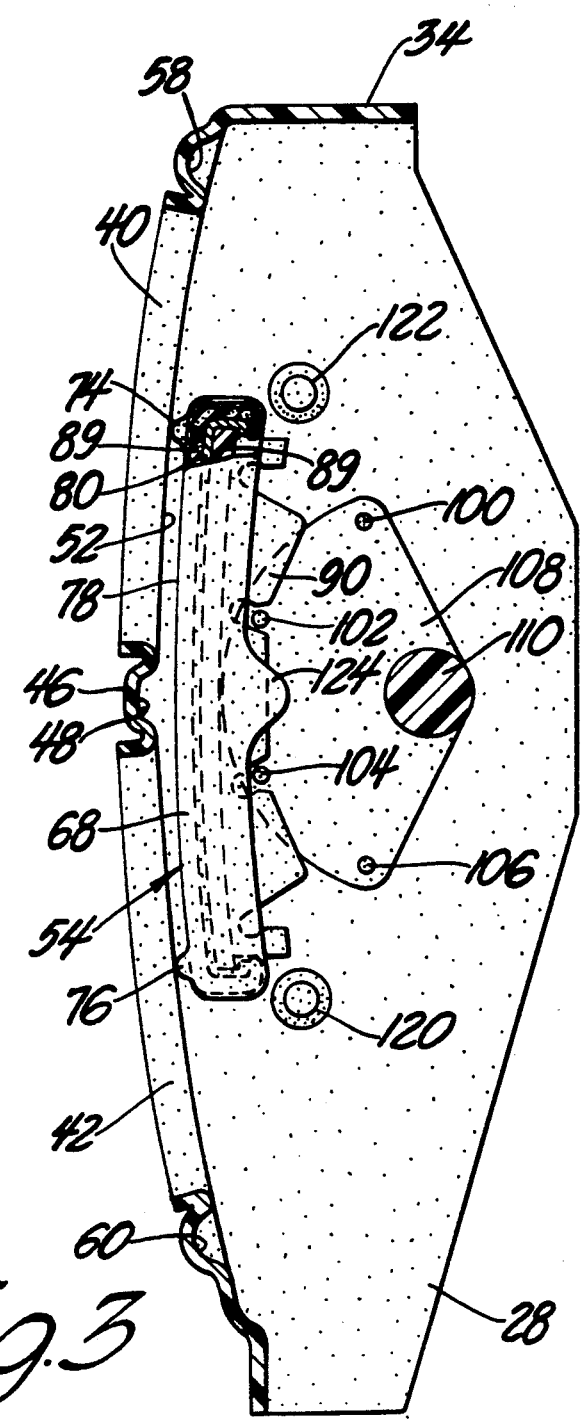
Fig. 6
Fig. 3

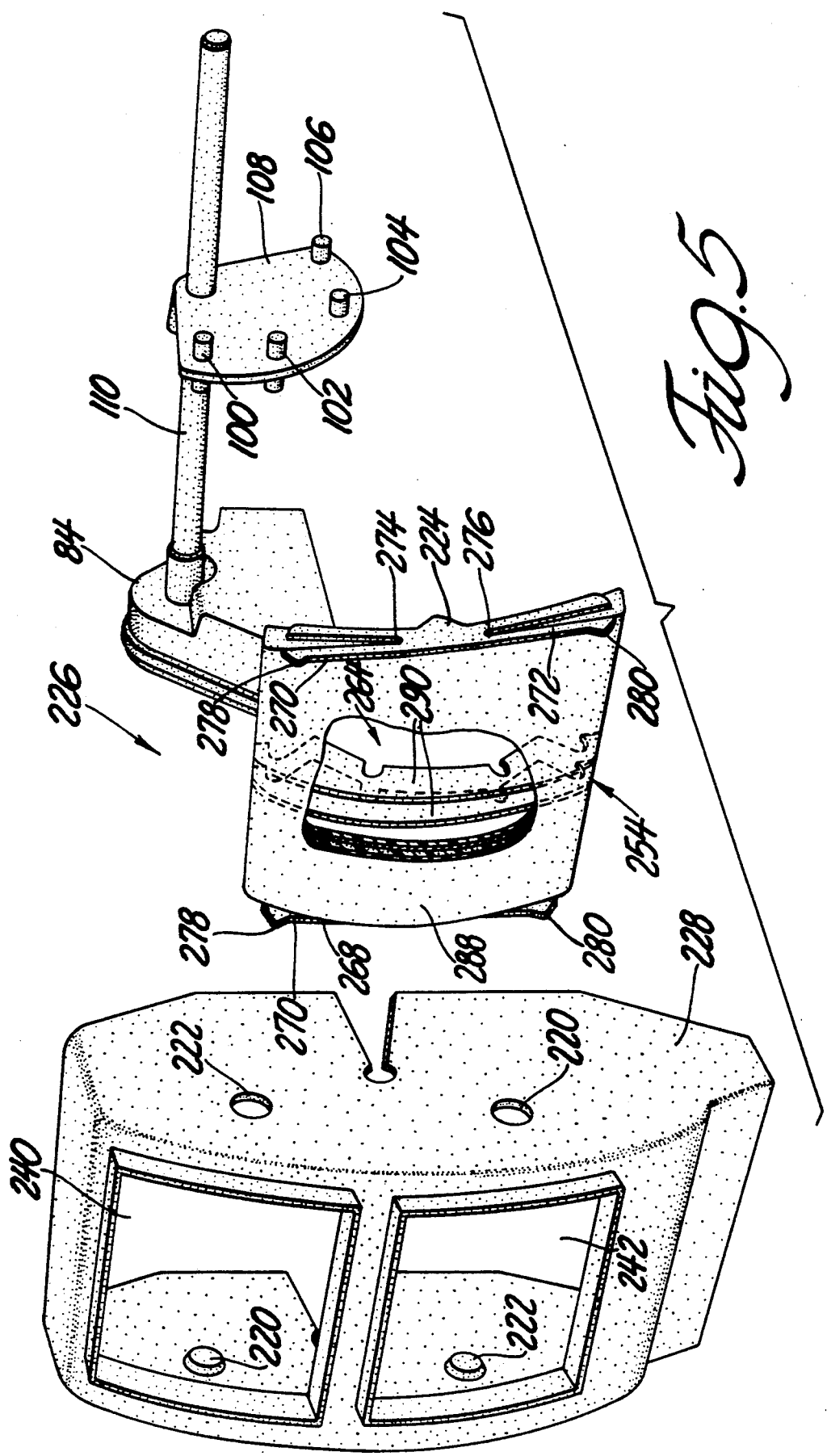

5,080,140

ROTARY AIR VALVE FOR AIR DISTRIBUTION SYSTEM IN VEHICLES

TECHNICAL FIELD

This invention relates to heating, ventilation and air condition (HVAC) systems for vehicles and more particularly to a new and improved rotary valve to optimize control of air distribution through the system, passenger comfort and service life of the valve as well as the valve actuator and other system components.

BACKGROUND OF THE INVENTION

Prior to the present invention, various valve arrangements have been employed in HVAC systems to control the distribution of air in the passenger compartment of a vehicle. In U.S. Pat. No. 4,683,931, assigned to the assignee of this invention and hereby incorporated by reference, a rotary air valve seal is provided to produce effective sealing and long wear by having a sealing surface whose radius of curvature is offset from that of the rotary axis of the valve so that predetermined pressure closure is established at the curved sealing surface to tightly seal the air discharge when the valve is closed. Because of this offset sealing force diminishes to zero when the valve is rotated to affect window opening and frictional drag of the rotary seal is substantially reduced or eliminated.

The present invention is of the general category of the rotary seal in the above referenced patent but further provides for a new and unobvious valve assembly and mechanisms for moving the seal into engagement with or away from the window opening for improved control over the air flow therethrough. These mechanisms operate in a forthright and expeditious manner to eliminate excessive seal wear by friction and further to provide a new and improved airtight seal of the flow windows providing improved control over the flow of air to the passenger compartment in the vehicle.

The valve system of this invention provides essentially a linear temperature gradient affording the operator with a wide range of adjustments for precise and discrete selection of temperatures within the passenger compartment. Accordingly, the vehicle driver or passenger enjoys a precisioned control of the temperature in the vehicle passenger compartment. Incremental movement of the control by the operator results in directly corresponding incremental movement of the valve, and with better matching of control movement with valve movement there is precisioned control over compartment temperature. This invention further advantageously utilizes the inherent elasticity of the seal material, such as foam rubber, to assist in lift of the valve element from the window when the valve is actuated to open one of the windows.

These and other features, object and advantages will be more apparent from the following Detailed Description and Drawings.

DESCRIPTION OF THE DRAWINGS

FIG. 3 is a cross sectional view with parts broken away of the rotary air valve of FIGS. 1 and 2 shown in a fully open position;

FIG. 5 is an exploded pictorial view similar to FIG. 2 illustrating another embodiment of the air valve of this invention;

FIG. 6 is a cross sectional view of the rotary air valve of FIG. 5 illustrated in an opened position.

DESCRIPTION OF THE PREFERRED EMBODIMENTS

Figure 1:
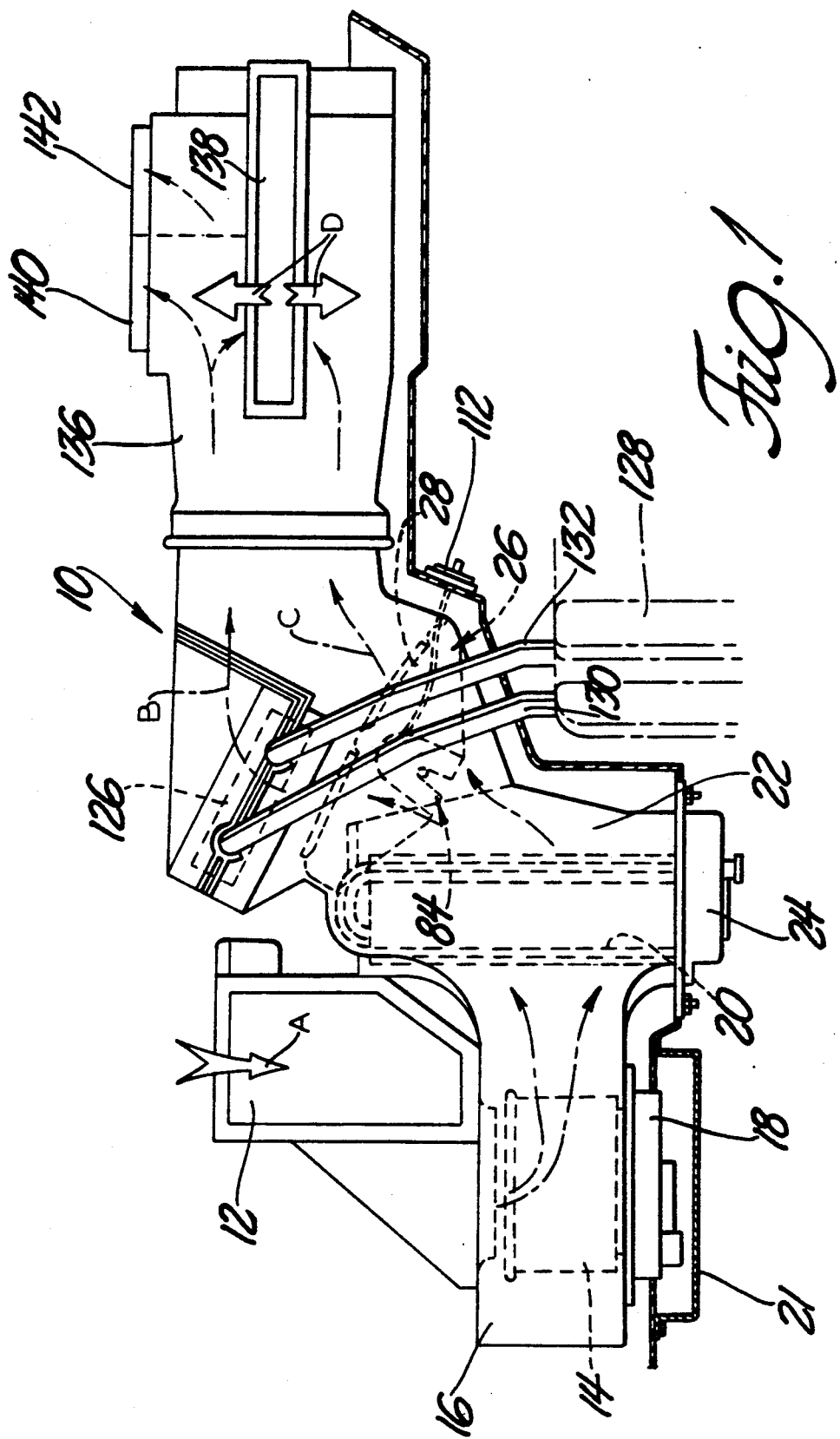
FIG. 1 is a diagrammatic top view of a vehicular heating, ventilating and air conditioning system for a vehicle.

Referring in greater detail to FIG. 1, there is diagrammatically illustrated a heating, ventilating and air conditioning (HVAC) system 10 for the occupant compartment of an automotive vehicle. The system includes a plurality of interfitted housing components of plastics or other suitable material including an air intake 12 through which air, flow arrow A, is supplied to an electrically powered rotary blower 14 operatively mounted in blower housing 16. The blower 14, driven by a brushless motor 18, forces air through an evaporator 20 of an air conditioning system, not shown. Cover 21 removably secured to its housing by threaded fasteners provides convenient access to the motor and blower for any service requirements. The evaporator 20 is mounted within an evaporator housing 22 which is integral with blower housing 16. A cover 24 is removably secured to the side of the housing 22 by threaded fasteners to provides a service access to the evaporator. Operatively mounted in the evaporator housing downstream of the evaporator is a rotary valve assembly 26 which provides a control of the direction and flow volume of the air streams in the HVAC system.

Figure 2:
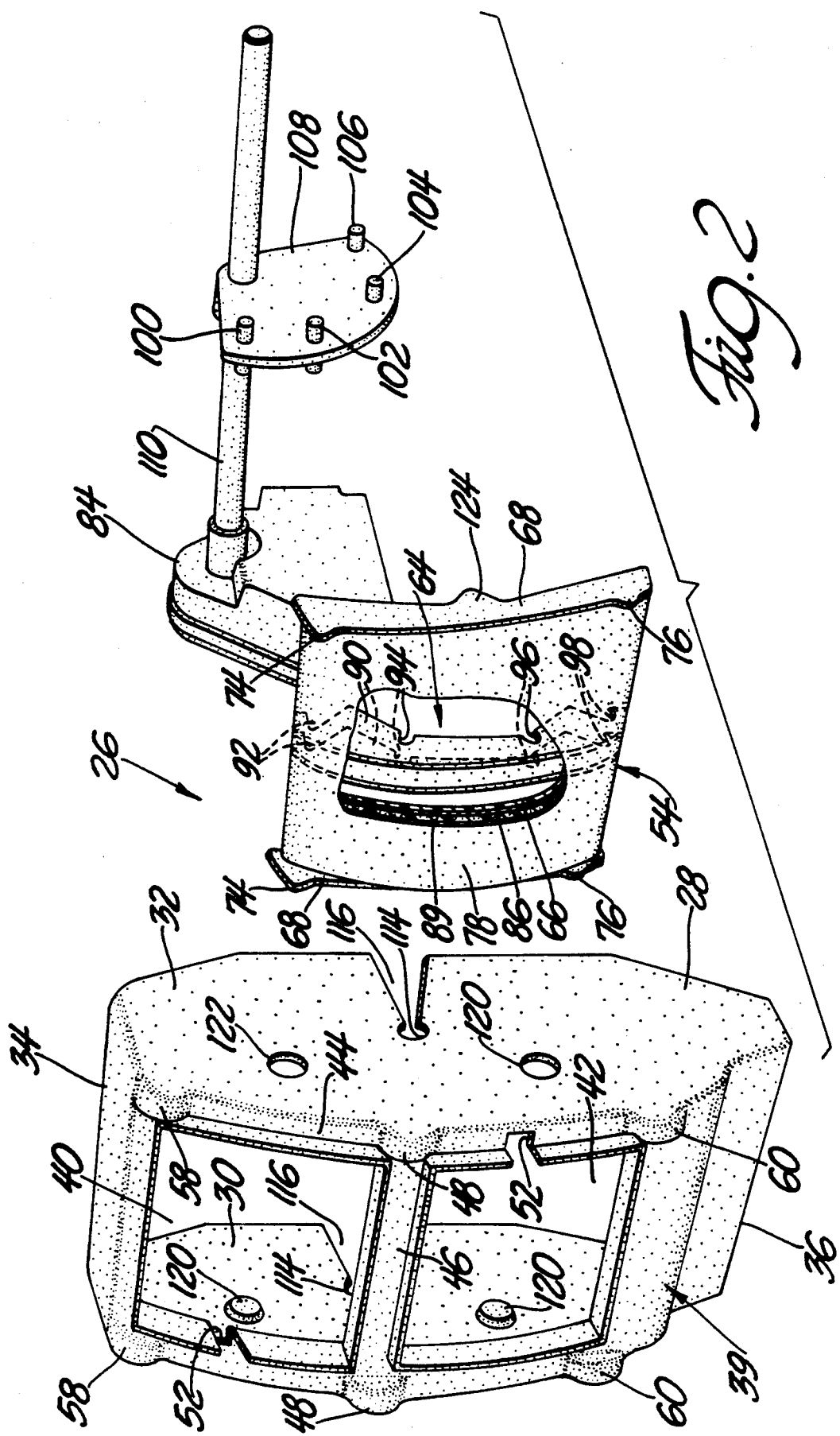
FIG. 2 is an exploded pictorial view of a rotary air valve used in the system of FIG. 1.

As shown in detail in FIG. 2, the rotary valve assembly 26 has a box like valve body 28 with side walls 30, 32, an upper end wall 34 and an open lower end 36 which may optionally be closed by an end wall, if desired. The valve body 28 is fully opened at its back or air inlet side for receiving air passing through the evaporator 20 of the air conditioning system. The front or air outlet side 39 of the valve body is curved and has a pair of discrete rectilinear windows 40, 42 formed therein. These windows extend almost across the entire width of the valve body and are separated by a centralized mullion 46. The opposite end portions of the inside surface of this mullion are formed with special depressions or pockets 48 as illustrated by FIGS. 2 and 3. Furthermore, the interior sides surfaces of the front face that define opposite sides of the windows provide parallel arcuate tracks 52, in which the centralized depressions 48 are formed, for guiding an arcuate window control valve 54 into open and closed position with respect to the windows 40, 42. The extremities of tracks 52 are also formed with special offset depressions 58, 60 aligned and cooperating with the centralized depression 48 to allow the valve to be displaced from the curvature of the track into a substantially airtight sealing position with respect to either of the windows.

The valve 54 includes a carrier 64 of suitable hard plastics having an arcuate base plate 66 which is connected to laterally extending side runners 68, the extremities of which have forwardly projecting contacts 74, 76 which ride on the tracks 52. These contacts hold the foamed plastics face 78 of the valve insert 80 away from inner surfaces of the housing to prevent undue wear of the foam from frictional contact with the inner surface of the valve body when the valve is being displaced and to decrease loads on the motor 84 used to shift the valve 54.

The valve insert 80 is made from a thin backing sheet 86 of resilient plastics material which has hook-like spring ends 88, 90 which yieldably hook over the ends of the carrier back plate 66 to releasably secure the valve insert 80 to the carrier 64. The backing sheet 86 is faced with a sheet of foamed plastic sealing material, hereafter called the seal 89, which has its inner surfaced is bonded to the backing sheet. With this spring-hook construction, the insert 80 can be readily removed and replaced if replacement service is needed.

The back side of the base plate 66 of the carrier 64 has a laterally spaced pair of gear rack sections 90 which are identical and are formed with tooth spaces 92, 94, 96, 98 therein. The tooth spaces are adapted to receive the peg like teeth 100, 102, 104, 106 that extend laterally from the flat body of a sector gear 108. The periphery of the sector gear is guided between the parallel rack sections as the teeth engage the tooth spaces so that the valve moves smoothly in an arcuate path on the tracks.

The sector gear 108 is fixed at its apex on a rotatable cylindrical shaft 110 rotatably driven by the reversible motor 84 mounted outboard of one side 30 of the valve body 28 and fixed thereto so that energization of the motor will turn shaft 110 and the attached sector gear 108. The motor energization and rotational direction are through suitable controls diagrammatically illustrated by manual control knob 112 in FIG. 1. The shaft 110 is retained in aligned circular openings 114 in the sides of the valve body 28. Slots 116 leading from the back of the valve body sides to the opening facilitate insertion of the shaft 110 into the retainer openings 114.

FIG. 3 shows the valve 54 in an operating position with the side runner contacts 74, 76 riding on tracks 52, 52 provided at the sides of the two windows so that the face of the seal 88 is offset from the inner surfaces of the valve body 28 which may include seal contact walls framing the windows. In this position the valve element is partially blocking both windows 40 and 42 so that flow of air from the blower 14 will flow through the core of the evaporator 20 such as air stream B which flows through the heater core 120 operatively connected to the cooling system of the engine 128 by conduits 130, 132. Air flow B may be accordingly dehumidified and heated and discharged through window 40 into air distribution housing 136 through a defrost opening 138 to flow as illustrated by flow arrow D over the interior of the glass windshield for defrost purposes. This air through window 40 can also flow out of closure and director vents 140, 142 for the vehicle passenger and driver.

The air flow from the evaporator is also split by the valve assembly 26 so that it flows through the partially open window 42 as air stream C which bypasses the heater core 126 and enters the air distribution housing 136 to flow through the vents for the passenger and driver as well as for opening 138 for the defrost.

From FIG. 3, the valve element 54 can be moved upon energization of motor 84 and resulting rotation of the sector gear 108 by the meshing of the pegged teeth of the sector gear with the surfaces of the gear rack sections which define the tooth spaces therein. When the valve 54 is moved from the FIG. 3 position toward the FIG. 4 position, the runners hold the valve insert off of the inner surfaces of the valve body to prevent abrasion and wear of the foam valve insert. Fixed cylindrical contact buttons 120, formed integrally on opposite sides of the valve body respectively contacts the lower face of the cam lobes 124 formed on each of the side runners 68 of carrier 64 intermediate the ends thereof. As this common action continues, the contact 74, 76 of the side runners of the carrier are moved into the depressions 48 and 60 and the valve 54 is forced in a generally forward direction so that the seal 88 is under an axial compression load to completely seal the opening of the window 42. This window may have internal framing walls which deflects the resilient foam in a perimeter around the opening for optimized sealing. On this cammed axial sealing movement of the valve there is substantially no drag of the seal insert across any part valve body including the periphery of the window. The contacts 74 and 76 of the side runners 68 fit with clearance in the depression 48 and 60 respectively, under the axial load provided by the cam to ensure a tight seal.

Figure 4:
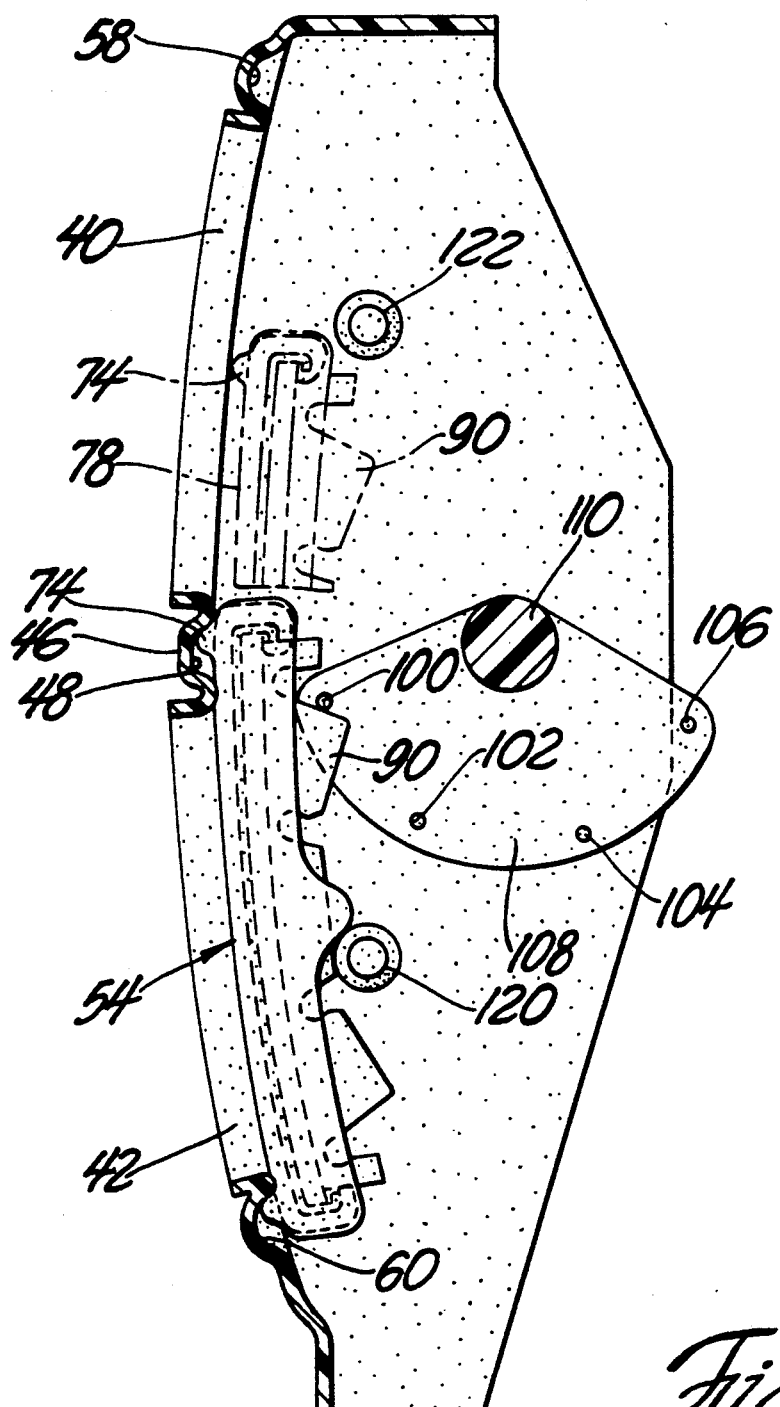
FIG. 4 is a view similar to the view of FIG. 3 but illustrating the valve in one of its window sealing positions.

In moving from the FIG. 4 position to affect opening of the window 42 the sector gear 108 is turned in an opposite direction by the motor 84 and first pegged tooth 100 begins to initiate window opening with a partial lift of the valve element 54 by the contact of the tooth 100 with the inclined surface defining tooth spaces 92. More importantly, the camming action by the walls of the depressions 48, and 60 and the force the valve axially away from the window so that the window is opened without frictional drag to allow the flow of air therethrough. In this action the recovery of the foam material from its deflected state, will assist in the axial movement of the valve from the window. It will be appreciated that with respect to the window 42, the valve 42 can be moved in a range from a fully closed to a fully opened position to control the flow therethrough.

In moving from the FIG. 4 position, the valve 54 can be powered by reversing the drive of motor 84 into an infinitely number of partial blocking or fully blocked position with respect window 40 in a manner as described above with respect to blocking window 42. In the blocking position the contact buttons 120 engage the upper sides of the cams 124. On continued rotation of sector gear 120, the valve 54 is forced into sealing engagement with respect to window 40. In the seated or sealed portion the contacts 74, 76 will fit into the depressions 58 and 48. On powered movement from the position in which the window 40 is fully blocked to a partial or fully opened position the camming action provided by the ramped walls of depressions 58 and 48 and the contacts 74, 76 forces the valve from the window opening or that the face of the foamed seal 88 will not be abrazed or torn.

Importantly, during all arcuate movement of the valve element, there will be no scraping or other contact of the sealing media with the components of the housing and the media service life is improved. Also, with frictional loads reduced. The motor 84 will have increased service life and a lighter motor can be employed. In the event that a manual system is employed to control the flow of air, the system will be easier to operate with the low load window control provided by this invention.

Importantly, in this invention the control is closely matched with the amount of valve movement. Accordingly, turning the switch in a first direction for a very short time will move the valve a corresponding short distance. A longer period of switch actuation provides a corresponding longer travel of the valves. By the improved correspondence of valve movement with selector actuation, there is improved selection and control of air routing and air volume through the system.

In both operation and construction, the embodiment of FIG. 5 and 6 is similar to the embodiment of FIGS. 2, 3 and 4 and the same reference numerals are used to identify various common parts. As shown in FIGS. 5 and 6, there is an air valve assembly 226 having a valve body 228 with windows 24 and 242, a valve assembly 254 which is turned to different closure positions by motor 84 via shaft 110 and sector gear 108 which has peg like teeth which mesh with the tooth spaces in the side by side curved racks 290 formed on the back side of the carrier 264 of the valve assembly 254.

The primary difference in the construction of the embodiment of FIGS. 5 and 6, as compared to the embodiment of FIGS. 2-4, is in the carrier and housing. As shown in FIGS. 5 and 6, the side runners of the carrier 264 have spring arms 270, 272 of plastics material which are live hinged at 274, 276 to the main body of the side runners. Formed at the ends of the spring arms are contacts 278, 280. As in the embodiment of FIGS. 2-4, these contacts ride on the side tracks on opposite sides of the windows 240, 242. The spring arms 270, 272 in their undeflected position resiliently hold the foamed plastic seal 288 from contacting the inner surfaces of the housing, so there will not be any significant frictional wear of the seal. When the cam lobes 224 on the side runners engage either of the contact buttons 220 and 222 as the valve is being turned by the motor, the carrier and its seal will be displaced toward the window as the spring arms deflect to a closed position for full sealing of the window 240 or 242.

When the valve element is moved to an open position from the window, the spring arms will recover immediately upon removal of the closure force exerted through the cam lobes to again space the seal from the interior of the housing. The recovery or spring action of the foamed seal assists in this spacing.

While the above description constitutes preferred embodiments of the invention, it will be appreciated that the invention can be modified and varied without departing from the scope of the accompanying claims.

We claim:

1. A valve assembly for controlling the flow of air through a passage from an air inlet leading into said passage to an air outlet leading from said passage, said valve assembly comprising a valve body operatively mounted in said passage, said body having a back providing an air inlet means and having a forward wall providing a plurality of air outlet windows to divert and to separate the air flow into different paths leading to said air outlet, said forward wall having peripheral edge portions on the inner side thereof defining the perimeters of said windows, valve means operatively mounted in said housing and movable to an infinite number of positions between a first closure station in which one of said windows is fully closed and sealed in an air tight manner to a second closure station in which another of said windows is fully closed and sealed in an air tight manner, said valve means including seal means and runner means disposed adjacent to said seal means for holding said seal means in a position in which frictional wear of said seal means by said forward wall is minimized when moving between said closure stations, actuator means for selectively moving said valve means in a substantially uniform path and into substantial alignment with any one of said windows and camming means for subsequently displacing said valve means into a seated position in which said seal means sealingly contacts the peripheral edge portions thereof for fully sealing said window substantially aligned therewith.

2. In an air delivery system for controlling the ambient air temperature within the passenger compartment of an automatic vehicle, a valve assembly for controlling the flow of air through a passage leading from an air inlet to an air outlet, said valve assembly comprising a valve body having an air intake and having a plurality of air outlet window means each having peripheral sealing areas thereabout, valve means operatively mounted in said valve body for selectively opening and for selectively closing each of said window means in an air tight manner, said valve means having window sealing means thereon, actuator means for selectively moving said valve means in a first path to predetermined positions spaced from one another in which an associated one of said window means is partly blocked and cam means for subsequently displacing said valve means from said predetermined positions in said first path into a sealing position in which said sealing means engages said peripheral sealing areas around said associated window means in an air tight manner so that air is diverted from said selected window means and caused to flow through other of said window means, and contact means responding to operation of said actuator means for moving said valve means and said sealing means from said peripheral sealing areas.

3. In an air distribution system for a vehicle, a casing having air inlet and air outlet means, the improvement comprising a rotary valve assembly operatively mounted in said casing for establishing separate air flow routes and for controlling the flow of air from said air inlet means to said air outlet means, said valve assembly having a housing fitted within said casing, said housing having an opening for receiving the flow of air from said inlet means and having discrete discharge openings for separating the flow leaving said housing into different flow paths, valve means operatively mounted within said housing for opening and closing said discharge openings, said valve means having resilient seal means thereon, actuator means for moving said valve means between a first position in which a first of said discharge openings is closed in an air tight manner and a second of said discharge openings is substantially open and a second position in which said first of said discharge openings is substantially open and said second of said discharge openings is closed in an air tight manner, and cooperating runner and track means for maintaining said seal means of said valve means from contact with said housing until said seal means on said valve means is moved into contact with portions of said housing that define any one of said discharge openings.

4. An air valve assembly for an air distribution system in a vehicle housing having sides laterally spaced from one another and having an end wall and further having a curved forward face, said housing having an opening means at the rear thereof to receive air from a source, said forward face having a first and second window means therein which are discrete from one another, said interior or said housing having track means extending along the sides of said window means, said valve element having a sealing face of a resilient sealing material and runner means on opposite sides of said valve element to contact said track means to maintain said valve element from contact with said inner surfaces of said housing to thereby prevent the frictional wear of said sealing face, and cam means to displace the valve means and the sealing face into physical contact with the periphery of either of said window means under an axial load for the effective air tight sealing thereof, and means for moving said valve from the periphery of said last mentioned window means and to a path that minimizes the abrasion of said sealing face.

5. The air valve assembly of claim 4 wherein the track means have depressions therein between said windows and beyond the extremities of said windows and wherein said runner means have track contacts which fit into said depression so that said sealing face can seal any selected one of said windows in an air tight manner.

6. An air valve assembly for an air distribution system in a vehicle housing having sides laterally spaced from one another and having an end wall and further having a curved forward face, said housing having an opening means at the rear thereof to receive air from a source, said forward face having a first and second window means therein which are discrete from one another, said interior or said housing having track means extending along the sides of said window means, said valve element having a sealing face of a resilient sealing material and having runner means on opposite side of said valve element to contact said track means to maintain said sealing face of said valve element from contact with said inner surfaces of said housing to prevent the frictional wear of said sealing element, and cam means to displace the valve means and the sealing face into physically contact with the periphery of either of said window means under an axial load for the effective air tight sealing thereof, and means associated with said runner means for moving said valve from the periphery of said last mentioned window means into a path that minimizes the abrasion of said sealing face, said runner means including spring arm contacts to yieldably maintain said sealing face of said valve means from said track.

7. A rotary valve assembly for controlling the flow of air therethrough, said valve assembly having a shell-like housing having an air inlet and having a pair of air outlet windows, a valve element including a seal means of resilient material movable between an infinitely number of positions in said housing in which both of said windows are partially blocked between a first station in which a first window is sealed in an air tight manner by said seal means of said valve element and said second window is open and a second station in which said second window is sealed in an air tight manner by said seal means of said valve element and said first window is opened, said valve element having runner means defining opposite sides thereof for holding said seal means from friction contact with said housing, said housing having track means on opposite sides of said windows for guiding said runner means and camming means for applying an axial load to said valve means to cam said valve means into said sealing stations.

8. The valve assembly of claim 7 wherein said track means have depressions therein to allow said valve means to be displaced axially with respect to said track so that said seal means is moved into sealing engagement with peripheral portions of said windows by said cam means.

9. A rotary valve assembly for controlling the flow of air therethrough, said valve assembly having a shell-like housing having an air inlet and having a pair of air outlet windows, a valve element including a seal means of resilient material movable between an infinitely number of positions in said housing in which both of said windows are partially blocked between a first station in which a first window is sealed in an air tight manner by said seal means of said valve element and said second window is open and a second station in which said second window is sealed in an air tight manner by said seal means of said valve element, said valve element having runner means defining opposite sides thereof for holding said seal means from friction contact with said housing, said housing having track means on opposite sides of said windows for guiding said runner means and camming means for applying an axial load to said valve means to said valve means into said sealing stations, said runner means having live hinge means with terminal contacts riding on said track means to yieldably maintain said seal means from the interior of said housing and said valve means from full sealing closure with respect to said windows and further to allow said seal means to be displaced into air sealing engagement with peripheral portions of said windows.

* * * * *